Oct. 26, 1943.    W. C. MILES    2,332,655
FLY TYING MACHINE
Filed July 31, 1940    2 Sheets-Sheet 1

INVENTOR.
William C. Miles

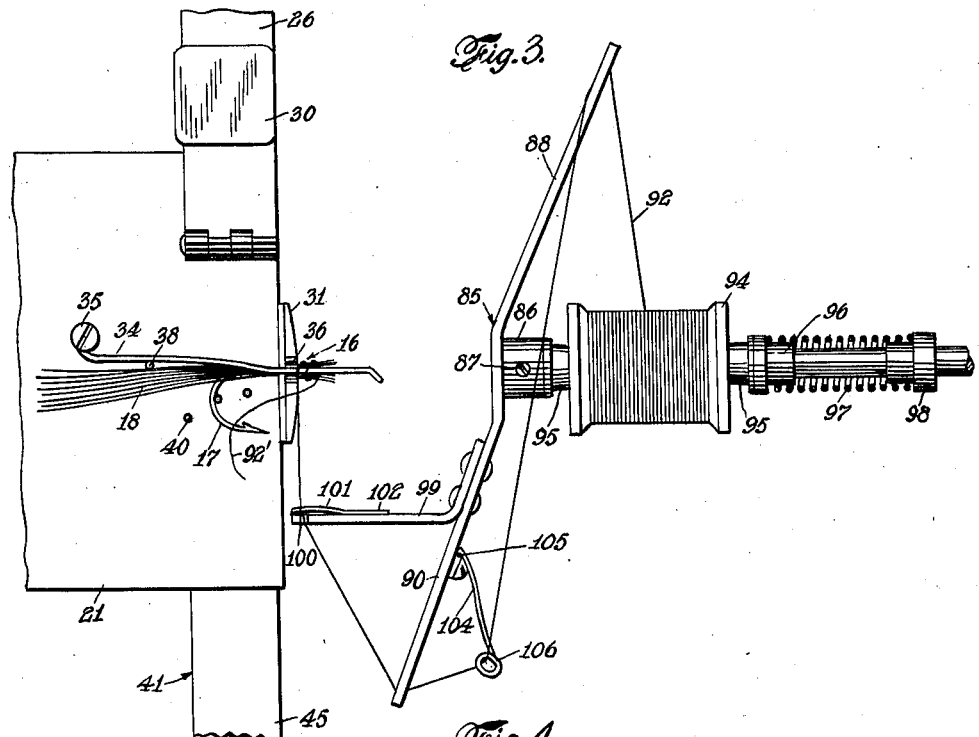
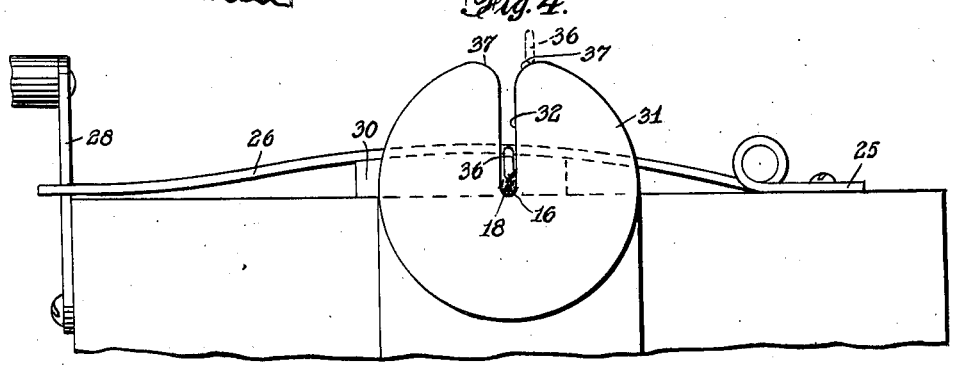
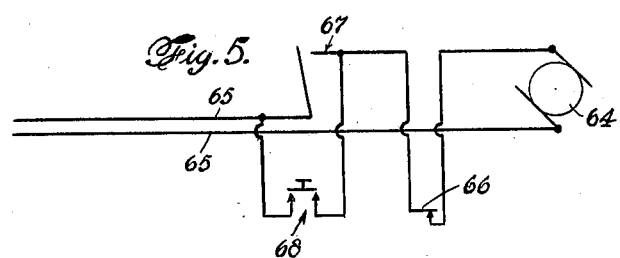

Patented Oct. 26, 1943

2,332,655

UNITED STATES PATENT OFFICE 2,332,655

FLY TYING MACHINE

William C. Miles, White Plains, N. Y.

Application July 31, 1940, Serial No. 349,025

20 Claims. (Cl. 242—7)

This invention relates to apparatus for use in the tying of fishing flies.

Important objects of the present invention are to facilitate the tying of flies and to make possible the carrying out of the tying operations in such manner as to produce a highly durable and dependable product.

Other objects and advantages of the invention will become apparent from the following description when taken in connection with the accompanying drawings wherein the invention is illustrated as embodied in a machine especially designed for the tying of flies of the so-called buck-tail type employed in the making of fish lures commercially known as Quilby minnows.

In the drawings:

Fig. 3 is an enlarged fragmental plan view showing the thread-winding mechanism and its relation to the hook assembly preparatory to the carrying out of the winding operation, the hook-assembly-clamp being shown in open position for the sake of clarity.

Fig. 4 is an enlarged fragmental end view of the hook-assembly-clamp-unit, and

Fig. 5 is a diagrammatic view illustrating the motor circuit and its associated control switches.

Figure 1:
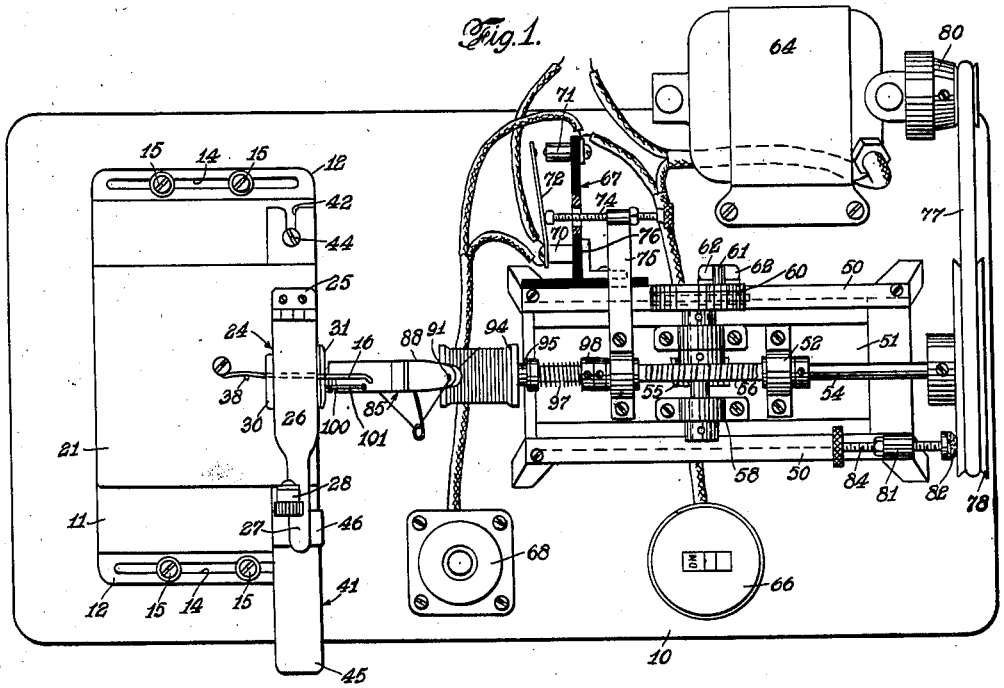
Fig. 1 is a plan view of a machine embodying the invention.

Referring particularly to the drawings, the numeral 10 indicates a base, on which is mounted a platform 11, provided at its lower opposite margins with a pair of laterally extending wings 12. The wings 12 are provided with elongated slots 14 adapted for the reception of lag screws 15 which enter the base 10 and by which the platform 11 may be securely anchored in such of its various positions of longitudinal adjustment as may be required under conditions hereinafter more particularly described.

Figure 2:
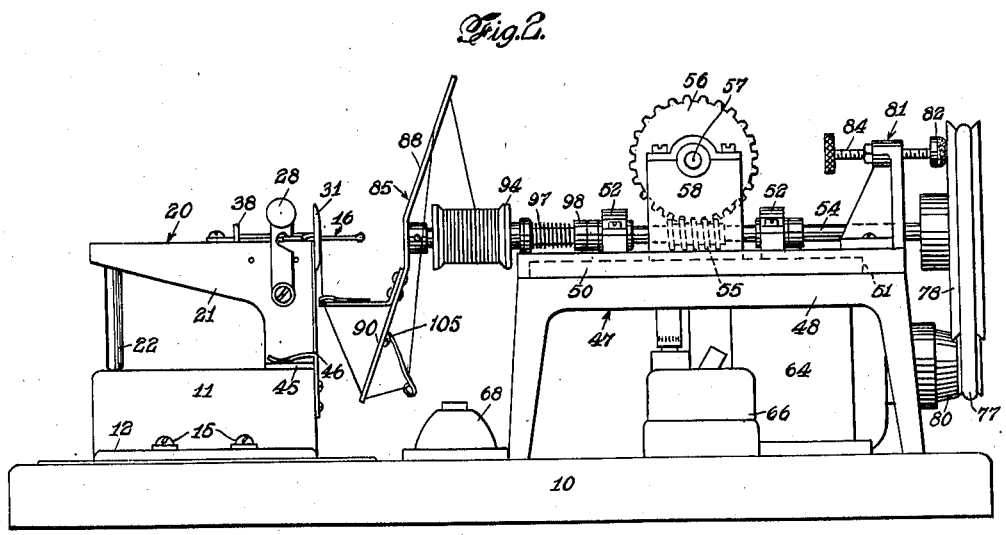
Fig. 2 is a side view of the machine.

In order that a hook-assembly, such as the hook-assembly 16 herein illustrated as including a fish hook 17 and a quantity of hair 18 to be attached to the hook shank, may be effectively held in such position as to enable the tying operation to be carried out, there is provided a hook-assemby-clamp unit 20. The unit 20 comprises a table 21, which as shown in Fig. 2, is substantially L-shaped in side elevation, one arm of the table being provided with a post-like leg 22, which, in conjunction with the other table arm, serves to support the table in a normal position of rest on the platform 11. The unit 20 also includes a hook-assembly-clamp 24, comprising a pair of wings 25 and 26 hingedly connected to each other, the wing 25 being secured to the table 21 and the wing 26 being adapted to be moved to its open and closed positions shown, respectively, in Figs. 3 and 4. The wing 26 is provided with a handle 27 by which the wing 26 may be conveniently moved to its open and closed positions, the handle being adapted for interlocking engagement with a latch 28 which is pivotally connected to the table 21 and is adapted to be moved into and out of its locking position shown in Figs. 1, 2 and 4, whereby the wing 26 may be held in its closed position shown in Figs. 1, 2 and 4 or released for movement to its open position shown in Fig. 3. The wing 26 is provided intermediate its ends with a clamp-pad 30, composed of a suitable resilient or yieldable material such as rubber having a clamp surface offering a relatively high coefficient of friction. This clamp-pad 30 is adapted to engage the hook assembly 16 at or in the vicinity of the bend of the hook 17 incident to movement of the wing 26 into its closed position, the wing being then placed under tension, as indicated from its bowed condition shown in Fig. 4, and thereby serving, when locked in its closed position, to maintain the pad 30 in intimate clamping engagement with the hook-assembly so as to hold the elements of that assembly against lateral shifting on the table 21. Lateral shifting of the hook-assembly elements is further obviated by reason of the presence of a guard disc 31 which is provided with a radial slot 32 adapted to receive the shank of the hook 17 and the strands of hair 18 which lie adjacent the hook shank and project outwardly from the table 21 along the hook shank. Additionally the hook-assembly elements are held in a proper relationship by a clamp arm 34, which is anchored to the table 21 by a screw 35 and is provided at its outer or free end with a ring-like eye 36 adapted to fit the slot 32 of the guard disc 31 with substantial freedom or clearance as shown in Fig. 4. The clamp arm 34 is constructed of spring wire, of circular cross-section, and is so shaped that it normally extends upwardly, from its point of connection with the table 21, at such an angle that the ring-like eye 36 rests, as indicated in dotted lines in Fig. 4, on one of the two cam-like faces 37 provided at the upper or entrance end of the guard-disc slot 32 in order to facilitate placing of the hook-assembly 16 in a proper position to be clamped on the table 21. It is to be observed that although the clamp arm 34 is so shaped that the ring-like eye 36 is normally maintained in its dotted line position shown in Fig. 4, the arm is adapted to flex transversely, reference being had to Fig. 3, as the eye 36 is carried into the slot 32 incident to downward flexing of the clamp arm under the depressing action of the wing 26 as it is moved toward and into its clamping position shown in Fig. 4. In order to insure transverse flexing of the clamp arm 34 at or about a fulcrum point substantially remote from the point at which that arm is anchored to the table 21, there is provided a fulcrum pin 38 which projects upwardly from the table and against which the clamp arm slidably impinges as it is depressed under the action of the wing 26.

A hook-assembly clamp-unit constructed according to the present invention may be used with equal effectiveness in connection with many different hook-assemblies, wherein, for example, the hooks are of different lengths and the hair to be attached to such hooks varies in quantity or a relatively wide range. To facilitate proper positioning of hook-assemblies having different length hooks, the table 21 may be provided with a series of indexing pins 40 arranged in accordance with the length of the hooks employed and adapted to receive thereabout the crook portions of the respective hooks as illustrated in Fig. 3.

In practice, a series or complement of hook-assembly-clamp-units 20 may be provided, such units being adapted to successively assume tying positions on the platform 11 as they are loaded with their respective hook-assemblies by one operator and passed on to the operator in charge of the machine. In order, therefore, that the hook-assembly-clamp units may be readily locked in and unlocked from their respective tying positions on the platform 11, each of such units is provided with a keeper bar 41 secured to the depending table arm as shown in Figs. 1, 2 and 3. The keeper bar 41 in each instance extends well beyond opposite sides of its associated table 21, one end of the bar being provided with a notch 42 adapted to slidably receive the shank portion of a headed screw 44 projecting upwardly from the platform 11 and the other end of the bar serving as a handle 45, which, at a point relatively near the table 21, is adapted to be moved under and held by the laterally disposed arm of a spring clamp 46 secured to the end face and overlying the upper face of the platform. From the description thus far of the keeper bar 42, it will be appreciated that the hook-assembly-clamp-units (all identical with the unit 20 herein illustrated) may be rigidly anchored successively in tying positions on the platform 11 and readily removed from such positions, thus enhancing the efficiency of operation of the machine in the carrying out of its prescribed function.

According to the present invention there is provided, for use in conjunction with the hook-assembly-clamp-unit 20, a thread-winding unit 47 by which the elements of a hook-assembly, such as the hook 17 and hair 18 of the hook assembly 16, may be effectively united. The winding unit 47 comprises a frame-like support 48 provided at its side margins with a pair of guide rails 50 forming with the bed of the frame-like support and with each other a way in which is guided a reciprocating carriage 51. The carriage 51 is provided with a pair of bearings 52, within which is journalled a shaft 54, provided intermediate its ends with a worm 55, meshing with a worm gear 56, secured to a shaft 57, which is journalled in a pair of bearings 58 mounted on the carriage. To one end of the shaft 57, there is connected an eccentric unit 60, of conventional design, in which its eccentric pin 61 may be conveniently adjusted radially with respect to the axis of the shaft. The eccentric pin 61 is adapted to operate intermediate a pair of stationary guide standards 62 which are secured to the frame-like support 48 at one side thereof, the function of the pin 61 in conjunction with the standards 62 being to effect reciprocatory movement of the carriage 51, the extent of which movement may be varied by changing the eccentricity of the pin 61.

The shaft 57 is rotated, incident to which reciprocation of the carriage 51 is effected, by an electric motor 64, in the circuit 65 of which there is interposed a manually operable (normally closed) switch 66 and an automatically operated control switch 67, about the latter of which is connected a normally open control switch 68 of the so-called door-bell type. With regard to the switches just mentioned, a detailed discussion as to structure is deemed unnecessary except as to the switch 67. This switch is of the single pole single-throw type and comprises a pair of terminals 70—71 which are connected in one leg of the motor circuit 65, the terminal 71 serving as a stationary contact cooperating with a movable spring contact 72 secured to the terminal 70 and adapted to move under its inherent tension into circuit-closing engagement with the stationary contact (terminal 71) as movement of the carriage 51 from left to right, reference being had to Figs. 1 and 2 is initiated incident to manual closing of the motor circuit by way of the control switch 68. Only a relatively slight movement of the carriage 51 from left to right is necessary to effect closing of the motor circuit 65 by way of the switch 67 after which the control switch 68 is permitted to assume open-circuit condition without interruption of the motor circuit until such time as the carriage 51 completes, or substantially completes, its return movement, at which time the spring contact 72 is automatically moved out of engagement with its associated terminal 71 which serves as a stationary contact. Automatic movement of the spring contact 72 to open-circuit position is effected by an operating post 74, mounted for longitudinal adjustment in the outer end of an arm 75 secured to and movable with the carriage 51, the operating post being adapted to move into engagement with the spring contact as the carriage approaches the end of its return travel and to move out of engagement with that contact immediately pursuant to initiating outward movement of the carriage by closing the motor circuit 65 through the switch 68. As will be readily understood, the switches 66 and 68 may be conveniently mounted on the base 10 of the machine, whereas the switch 67 may be mounted on the support 47 at one side thereof through the intermediary of its included switch-base 76, of insulating material, to which the terminals 70 and 71 are secured.

From the description thus far of the winding unit 47, it will be understood that since the motor 64 is operatively connected to the shaft 54 (as by a belt 77 passing about the V-groove pulleys 78 and 80 carried, respectively, by the shaft 54 and the shaft of the motor 64), the shaft 54, during one complete cycle of operation of the machine, will make a definite number of revolutions, depending on the gear ratio existing between the worm 55 and worm gear 56. For example, if such gear ratio is in the order of forty to one, the shaft 54 will make forty revolutions for each cycle of operation of the machine during which time the carriage 51, together with its associated shaft 54, moves from its normal position of rest shown in Figs. 1 and 2 to its limit of travel (left to right) and then returns to its starting position. In order to insure stopping of the carriage 51, pursuant to the opening of the motor circuit at the switch 67, in a position corresponding to the limit of its path of return movement, an adjustable brake 81 is provided. This brake may be conveniently mounted on the frame-like support 47 and includes a yieldable friction-pad 82 which, through the medium of its adjustable screw-support 84 is adapted to be so positioned as to engage the pulley 78 and apply thereto a braking action at or about the instant the carriage 51 reaches the extent of its return movement as determined by the throw of eccentric pin 61.

Simultaneous rotation and translation of the shaft 54 is taken advantage of to effect an intimate union with each other of the hook-assembly elements, such as those herein illustrated as including the fish hook 17 and the quantity of hair 18. In this connection it is to be observed that the shaft 54, hereinafter referred to as a winding shaft, is provided with a readily attachable and detachable winding head 85 comprising a socket-like hub 86 adapted to receive the end of the winding shaft on which such hub is removably anchored by a set screw 87. The hub 86 is provided with a pair of outwardly extending arms 88 and 90 disposed in parallel planes passing through the axis of the winding shaft at substantially less than right angles thereto. The arm 88, hereinafter referred to as a stripper arm, is provided at its end with an eye 91 (Fig. 1) by way of which a suitable binding thread 92 passes from a supply spool 94 rotatably supported on the winding shaft 54. In order that the spool 94 may rotate smoothly on the winding shaft 54 as the thread 92 is stripped therefrom during the winding operation, such spool is provided at opposite ends of its central bore with a pair of suitable bushing-like bearings 95 which rotate with the spool but are readily removable therefrom in order that they may be used again as it becomes necessary to substitute a new spool of thread for a previously depleted one. Spool substitution may be readily accomplished by removing the depleted spool from the winding shaft 54 after detaching the winding head 85 from that shaft. In order that a suitable braking action, for the purpose of setting up a desired thread-tension, may be imparted to the spool 94 as the thread 92 is being stripped therefrom during a winding operation, the winding shaft 54 is equipped with a slidable thrust-brake in the form of a headed-sleeve 96, which is urged into intimate face-to-face engagement with one of the bearings 95 by a thrust spring 97, embracing the winding shaft and engaging an adjustable collar 98, which is carried on that shaft and by which the compression force of the thrust spring may be varied according to the degree of braking action required as the thread is stripped from the spool while its associated bearings 95 are impinged between the hub 86, of the winding head 85, and the sleeve 96 of the thrust-brake. The winding-head arm 90, hereinafter referred to as a feed-arm, is provided at its end with an eye (not shown) which corresponds to the eye 91 of the stripper arm 88 and through which the thread 92 passes as it is wound about the shank of the hook 17 and its associated strands of hair 18 where they project outwardly from the table 21 beyond the guard disc 31. In order that the thread 92 may be effectively guided in the laying of it about the hook-shank (from left to right and then from right to left, reference being had to Figs. 1, 2 and 3) in accordance with the reciprocatory movement of the carriage 51, the feed arm 90 is provided with a laterally extending guide arm 99 which, for the sake of easy threading, is provided at its outer end with a transverse slot 100 by way of which the thread passes from the feed-arm 90 onto the hook shank. Preferably the guide arm 99 is provided with a keeper 101, in the form of a spring wire, one end of which, as shown at 102, is secured to the guide arm 99 and the other or free end of which overlies the slot 100 in such manner that the thread 92 when introduced into the outer end of the slot may be thereafter so passed between the outer ends of the guide arm and keeper as to enable it to assume its threaded position at the bottom of the slot where it is held by the keeper against undue displacement. In order that the thread 92 may be maintained at a uniform, or substantially uniform, tension despite any off-center relationship that may exist between the hook-shank and the winding shaft 54 during the winding operation, the feed arm 90 is equipped with a tension arm 104, in the form of a spring-wire, one end of which is secured to the feed arm, as at 105, and the other end of which is provided with a ring-like eye 106 through which the thread passes. It is to be noted that during a winding operation, the tension arm 104 will yield slightly to the tension set up in the thread 92 under the braking action exerted on the spool 94 by the previously described thrust brake. However, if an abnormal thread-tension condition is suddenly or otherwise encountered, the tension arm 104 will further yield and will thereafter return to its normal flexed condition as the spool 94 so turns on the shaft 54 as to supply sufficient thread to permit the normal thread-tension condition to be resumed.

In order that the thread 92 may be effectively locked in place on the hook-shank at the beginning of a winding operation, the starting end 92' of such thread is, as shown in Fig. 3, twice looped about the shank of the hook in a clockwise direction, reference being had to Fig. 4, and is then brought back on the table 21. Thus, it will be understood that since the winding operation is carried out in a counter-clockwise direction, reference being had to Fig. 4, the thread 92 will be wound about the looped portion of such thread at the beginning of the winding operation and thereby held at its starting end 92' against unwinding upon completion of the winding operation. In order to secure the finishing end of the binding against unwinding upon completion of the winding operation, that portion of the hook-assembly on which the thread 92 is to be wound is supplied with a suitable cement either before or after the thread is looped in place but before the winding operation is initiated. The applied cement oozes outwardly between the windings of the thread 92 as such thread is wound on the hook-assembly and serves to permanently secure all of the windings in place, thus permitting the thread at the finishing end of the binding to be severed close to the hook-shank without the likelihood of its unwinding from the completed hook-assembly. Moreover, the cement thus employed enters the interstices between the elements of the hook-assembly, such as the hook 17 and hair 18 of the hook-assembly 16 herein shown, and serves to unite these elements into a highly durable unit.

When it becomes necessary to vary the length of the binding as measured longitudinally of the hook-shank, such variation may be effected by so changing the eccentricity of the eccentric pin 61 as to obtain that extent of reciprocatory movement of the carriage 51 which corresponds to the desired binding-length. If a change in the eccentricity of the pin 61 is such that it becomes necessary or desirable to correspondingly adjust the platform 11 toward or away from the winding head 85 in order, for example, that the juncture of the hook-shank and the immediately adjacent outer face-portion of the guard disc 31 lies in the perpendicular plane of the guide-arm-slot 100 at the beginning of a winding operation (see Figs. 1, 2 and 3), such adjustment of the platform may be effected by loosening the lag screws 15 and moving the platform to the desired position, whereupon it is again anchored on the base 10 by the lag screws.

Obviously, in view of the foregoing, no further description of either the construction or operation of the machine herein illustrated becomes necessary to enable one to practice the present invention. However, it may be well to point out the fact that the hook-assembly-clamp unit 20, herein described as one of a useful series of such units, is such that it may be used with equal effectiveness in connection with hook-assemblies, wherein the hooks may vary substantially not only in length but also in shank-diameter and wherein the hair or other material to be attached to such hooks may vary in bulk or quantity over a relatively wide range. Such self adaptation of the clamp-unit to meet varying hook-assembly conditions is accounted for, at least in part, by the relationship existing between the clamp arm 34 and the guard-disc slot 32, it being observed in this connection that the ring-like eye 36 of the clamp arm is dimensioned to freely enter the slot and, due to the cross-sectional contour of the wire from which the clamp arm is formed, presents a wedging surface between which and the walls of said slot are impinged the elements of the hook assembly. Regarding the impinging action just mentioned it is found in practice that a portion of the flexible material entering into the hook assembly is crowed into the spaces afforded between the side walls of the guard-disc slot 32 and the wedging surface presented by the ring-like eye 36 of the clamp arm whereas the remaining portion of the flexible material in the vicinity of such eye, together with the adjacent portion of the hook-shank, is impinged between that eye and the bottom wall of the guard-disc slot. It is believed that the operation just described as peculiar to the clamp arm, particular reference being had to the ring-like eye 36 thereof, in conjunction with the walls of the guard-disc slot 32 can be definitely regarded as primarily responsible for the effective holding of the hook-assembly elements against undue displacement and for the self adaptation of the clamp unit to varying hook-assembly conditions. However, it does appear that the effectiveness of the holding action exerted on the hook assembly, and the self adaptation of the clamp unit to varying hook-assembly conditions, is enhanced, at least to a limited extent, by reason of the fact that the ring-like eye 36 is disposed in the plane of the guard-disc slot 32 when engaging the hook-assembly unit and is therefore adapted, due to its circular formation and the cross-sectional contour of the wire from which it is formed, to afford a point contact with the hook assembly, thus enabling it to penetrate, so to speak, that assembly and in so doing move or crowd a portion of the flexible material of such assembly into the spaces afforded between said eye and the side walls of said slot.

Although only one form of machine is herein illustrated as embodying the invention, it will be understood that various changes may be made in such machine without departing from the spirit of the invention or the scope of the following claims.

What is claimed is:

1. In an apparatus for use in the tying of a fish-hook assembly made up of a plurality of assembly elements including a fish hook having a shank; a hook-assembly clamp unit comprising a hook-retaining member receiving said elements in bunched relation and with contiguous portions thereof exposed to receive thereabout a binding thread, and clamp means movable into clamping engagement with said hook-assembly and cooperating with said retaining member to hold said assembly elements in bunched relation and against relative displacement longitudinally of said shank preparatory to and during a tying operation.

2. In an apparatus for use in the tying of a fish-hook-assembly made up of a plurality of assembly elements including a fish hook having a shank; a hook-assembly clamp unit comprising a hook-retaining member having a slot receiving said elements in bunched relation and with rearwardly extending portions thereof disposed in clamping positions and with forwardly extending portions thereof disposed in binding-thread-receiving positions, and clamp means movable into clamping engagement with the rearwardly extending portions of said assembly elements and cooperating with said retaining member to hold said assembly elements in bunched relation and against relative displacement longitudinally of said shank preparatory to and during a tying operation.

3. In an apparatus for use in the tying of a fish-hook-assembly made up of a plurality of assembly elements including a fish hook having a shank; a hook-assembly clamp unit comprising a hook-retaining member having a slot receiving said elements in bunched relation and with rearwardly extending portions thereof disposed in clamping positions and with forwardly extending portions thereof disposed in binding-thread-receiving positions, and clamp means movable into clamping engagement with the rearwardly extending portions of said assembly elements and that portion of said assembly which is confined within said slot, whereby said assembly elements are held in bunched relation and against relative displacement longitudinally of said shank preparatory to and during a tying operation.

4. In an apparatus for use in the tying of a fish-hook-assembly made up of a plurality of assembly elements including a fish hook having a shank; a hook-assembly clamp unit comprising a hook-retaining member having a slot receiving said elements in bunched relation and with rearwardly extending portions thereof disposed in clamping positions and with forwardly extending portions thereof disposed in binding-thread-receiving positions, clamp means including a clamp member adapted to be moved into clamping engagement with the rearwardly extending portions of said assembly elements and a second clamp member adapted to be moved into clamping engagement with that portion of said assembly which is confined within said slot, whereby said assembly elements are held in bunched relation and against relative displacement longitudinally of said shank preparatory to and during a tying operation.

5. In an apparatus for use in the tying of a fish-hook-assembly made up of a plurality of assembly elements including a fish hook having a shank; a hook-assembly clamp unit comprising a hook-retaining member having a slot receiving said elements in bunched relation and with rearwardly extending portions thereof disposed in clamping positions and with forwardly extending portions thereof disposed in binding-thread-receiving positions, clamp means operable to hold said assembly elements against relative displacement longitudinally of said shank preparatory to and during a tying operation and including a clamp member adapted to be moved into clamping engagement with the rearwardly extending portions of said assembly elements and a second clamp member adapted to be moved into clamping engagement with that portion of said assembly which is confined within said slot, said second clamp member being dimensioned to freely enter said slot and presenting at its slot-entering portion a wedging surface between which and the walls of said slot are impinged said assembly elements.

6. In an apparatus for use in the tying of a fish-hook-assembly made up of a plurality of assembly elements including a fish hook having a shank; a hook-assembly clamp unit comprising a hook-retaining member having a slot receiving said elements with rearwardly extending portions thereof disposed in clamping positions and with forwardly extending portions thereof disposed in binding-thread-receiving positions, clamp means operable to hold said assembly against displacement during a tying operation and including a clamp member adapted to be moved into clamping engagement with the rearwardly extending portions of said assembly elements and a second clamp member disposed transversely of the path of movement of the first mentioned clamping member and adapted to be moved by the first-mentioned clamp member into clamping engagement with that portion of said assembly which is confined within said slot, said second clamp member being dimensioned to freely enter said slot and presenting at its slot-entering portion a wedging surface between which and the walls of said slots are impinged said assembly elements.

7. In an apparatus for use in the tying of a fish-hook assembly made up of a plurality of assembly elements including a fish hook having a shank; a hook-assembly clamp unit exerting an impinging force against said elements and retaining them against relative displacement longitudinally of said shank while maintaining contiguous portions of said elements exposed to receive thereabout a binding thread, and a thread-winding unit cooperatively related to said clamp unit and including a rotatable winding head operable to effect application of a binding thread to said contiguous portions of said assembly elements.

8. In an apparatus for use in the tying of a fish-hook assembly made up of a plurality of assembly elements including a fish hook having a shank; a hook-assembly clamp unit exerting an impinging force against said elements and retaining them against relative displacement longitudinally of said shank while maintaining contiguous portions of said elements exposed to receive thereabout a binding thread, a thread-winding unit cooperatively related to said clamp unit and including a rotatable winding head operable to effect application of a binding thread to said contiguous portions of said assembly elements, and control means operable to initiate rotation of said winding head and to limit it to a definite number of revolutions whereby a predetermined number of windings of said thread is applied to said contiguous portions of said assembly elements.

9. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, and a thread-winding unit cooperatively related to said clamp unit and including a winding head mounted for rotation about and for cyclic travel back and forth along the axis of the shank of said hook to effect application of a thread to said contiguous portions of said assembly elements and there build up a multi-layer binding extending lengthwise of said shank.

10. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding head mounted for rotation about and for travel back and forth along the axis of the shank of said hook to effect application of a thread to said contiguous portions of said assembly elements and there build up a binding extending lengthwise of said shank, and control means operable to initiate rotation of said winding head and to limit it to a definite number of revolutions whereby a predetermined number of windings of said thread is applied to said contiguous portions of said assembly elements.

11. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding head mounted for rotation about and for cyclic travel back and forth along the axis of the shank of said hook to effect application of a thread to said contiguous portions of said assembly elements and there build up a multi-layer binding extending lengthwise of said shank, and means for varying the extent of back-and-forth travel of said winding head whereby the length of said binding may be correspondingly varied.

12. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding head mounted for rotation about and for cyclic travel back and forth along the axis of the shank of said hook to effect application of a thread to said contiguous portions of said assembly elements and there build up a multi-layer binding extending lengthwise of said shank, control means operable to initiate rotation of said winding head and to limit it to a definite number of revolutions whereby a predetermined number of windings of said thread is applied to said contiguous portions of said assembly elements, and means for varying the extent of back-and-forth travel of said winding head whereby the length of said binding may be correspondingly varied.

13. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft, a thread-carrying spool rotatably supported on said shaft, and a winding head carried by said shaft and adapted to deliver thread from said spool to said contiguous portions of said assembly elements and there apply it as a binding during rotation of said shaft.

14. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft, a thread-carrying spool rotatably supported on said shaft, a winding head carried by said shaft and adapted to deliver thread from said spool to said contiguous portions of said assembly elements and there apply it as a binding during rotation of said shaft, and control means operable to initiate rotation of said shaft and to limit it to a definite number of revolutions whereby a predetermined number of windings of said thread is applied to said contiguous portions of said assembly elements.

15. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft journalled for rotation about the axis of the shank of said hook and mounted for travel back and forth along such axis, a thread-carrying spool rotatably supported on said shaft, and a winding head carried by said shaft and adapted to deliver thread from said spool to said contiguous portions of said assembly elements and there apply it as a binding during rotation of said shaft.

16. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft journalled for rotation about the axis of the shank of said hook and mounted for travel back and forth along such axis, a thread-carrying spool rotatably supported on said shaft, a winding head carried by said shaft and adapted to deliver thread from said spool to said contiguous portions of said assembly elements and there apply it as a binding during rotation of said shaft, and control means operable to initiate rotation of said shaft and its associated winding head and to limit such shaft and such head to a definite number of revolutions whereby a predetermined number of windings of said thread is applied to contiguous portions of said assembly elements.

17. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft journalled for rotation about the axis of the shank of said hook and mounted for travel back and forth along such axis, a thread-carrying spool rotatably supported on said shaft, a winding head carried by said shaft and adapted to deliver thread from said spool to said contiguous portions of said assembly elements and there apply it as a binding during rotation of said shaft, control means operable to initiate rotation of said shaft and its associated winding head and to limit such shaft and such head to a definite number of revolutions whereby a predetermined number of windings of said thread is applied to contiguous portions of said assembly elements, and means for varying the extent of back-and-forth travel of said winding head whereby the length of said binding may be correspondingly varied.

18. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft, a thread-carrying spool rotatably supported on said shaft, a winding head carried by said shaft and adapted to deliver thread from said spool to said contiguous portions of said assembly elements and there apply it as a binding during rotation of said shaft, and friction means for maintaining said thread under tension as it is delivered from said spool to said contiguous portions of said assembly elements.

19. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft, a thread-carrying spool rotatably supported on said shaft, a winding head carried by said shaft and adapted to deliver thread from said spool to said contiguous portions of said assembly elements and there apply it as a binding during rotation of said shaft, control means operable to initiate rotation of said shaft and to limit it to a definite number of revolutions whereby a predetermined number of windings of said thread is applied to said contiguous portions of said assembly elements, and friction means for maintaining said thread under tension as it is delivered from said spool to said contiguous portions of said assembly elements.

20. In an apparatus for use in the tying of a fish-hook assembly made up of a plurality of assembly elements including a fish hook having a shank; a hook-assembly clamp unit adapted to retain said elements against displacement and maintain contiguous portions thereof exposed to receive thereabout a binding thread, a thread-winding unit cooperatively related to said clamp unit and including a winding shaft journalled for rotation about the axis of the shank of said hook and mounted for travel back and forth along such axis, a thread-carrying spool rotatably supported on said shaft, a winding head carried by said shaft and adapted to deliver thread from said spool to said contiguous portions of said assembly elements and there apply it as a binding during rotation of said shaft, and friction means for maintaining said thread under tension as it is delivered from said spool to said contiguous portions of said assembly elements.

WILLIAM C. MILES.